United States Patent [19]

Endo et al.

[11] Patent Number: 5,514,462
[45] Date of Patent: May 7, 1996

[54] POLYESTER FILM COMPRISING A MIXTURE OF POLYESTERS FOR HIGHLY HEAT SENSITIVE ORIGINAL SHEET FOR STENCIL PRINTING

[75] Inventors: Kazuo Endo, Yokohama; Megumi Komiyama, Yokkaichi; Shinobu Suzuki, Machida, all of Japan

[73] Assignee: Diafoil Hoechst Company, Limited, Tokyo, Japan

[21] Appl. No.: 291,703

[22] Filed: Aug. 16, 1994

[30] Foreign Application Priority Data

| Aug. 17, 1993 | [JP] | Japan | 5-203288 |
| Aug. 17, 1993 | [JP] | Japan | 5-203289 |
| Sep. 7, 1993 | [JP] | Japan | 5-222618 |
| Sep. 10, 1993 | [JP] | Japan | 5-226131 |
| Dec. 8, 1993 | [JP] | Japan | 5-308011 |

[51] Int. Cl.$^6$ .................................. B23B 5/16
[52] U.S. Cl. .................. 428/323; 428/331; 428/340; 428/338; 428/480; 101/125; 101/127; 101/128.21; 101/128.4
[58] Field of Search ............... 428/131, 323, 428/331, 333, 338, 340, 480, 283; 101/125, 128.21, 127, 128.4

[56] References Cited

U.S. PATENT DOCUMENTS

| 4,766,033 | 8/1988 | Yoshimura et al. | 428/332 |
| 5,061,565 | 10/1991 | Aoki et al. | 428/409 |
| 5,245,932 | 9/1993 | Ujiie | 101/128 |
| 5,303,647 | 4/1994 | Seo et al. | 101/125 |
| 5,360,665 | 1/1994 | Sato et al. | 428/323 |

FOREIGN PATENT DOCUMENTS

| 155966 | 10/1985 | European Pat. Off. . |
| 210040 | 1/1987 | European Pat. Off. . |
| 406884 | 1/1991 | European Pat. Off. . |
| 529632 | 3/1993 | European Pat. Off. . |
| 62-149496 | 7/1987 | Japan . |
| 63-160895 | 7/1988 | Japan . |
| 63-312192 | 12/1988 | Japan . |
| 3030996 | 2/1991 | Japan . |

*Primary Examiner*—Patrick J. Ryan
*Assistant Examiner*—Merrick Dixon
*Attorney, Agent, or Firm*—Foley & Lardner

[57] ABSTRACT

A heat sensitive original sheet for stencil printing made of a laminate of a paper sheet and a biaxially oriented polyester film having a melting point of 150° to 240°, a thickness of 0.2 to 3 μm, an average refractive index of 1.570 to 1.578, a thermal shrinkage stress of 100 to 800 g/mm$^2$ after being treated at 80° C. for 10 seconds, a thermal shrinkage factor of 5 to 50% after being treated at 80° C. for 10 minutes, a shrinkage factor of 15% or less after being treated in toluene at 25° C. for 10 minutes, and a center line average surface roughness of 0.02 to 0.3 μm, which original sheet is excellent in a perforation sensitivity, resistance to curling, and resolution and image density of a printed image.

19 Claims, No Drawings

POLYESTER FILM COMPRISING A MIXTURE OF POLYESTERS FOR HIGHLY HEAT SENSITIVE ORIGINAL SHEET FOR STENCIL PRINTING

BACKGROUND OF THE INVENTION

1. Field of the Invention

The present invention relates to a polyester film for a highly heat sensitive original sheet for stencil printing. In particular, the present invention relates to a film for a highly heat sensitive original sheet for stencil printing, which comprises at least two polyester resins having specific properties, is excellent in a perforation sensitivity and resistance to curl because of its specific shrinking characteristics, and also excellent in resolution and image density of a printed image.

2. Description of the Related Art

Hitherto, as a heat sensitive original sheet for stencil printing, a laminate of a thermoplastic resin film such as a polyester film and a porous thin (tissue) paper sheet. The film to be used in this use is required to have the following properties:

(1) The film has a good handling property and productivity in the preparation of the film itself and the original sheet. That is, in the preparation of the film, the film has good drawability and does not suffer from troubles such as breakage. Further, it should have good winding and slitting properties, so that it is not wrinkled or does not suffer from telescopic winding. In the preparation of the original sheet, it should not cause troubles in an unwinding step or during traveling of the film in the steps.

(2) The film should have sufficient strength and modulus for enduring the lamination works with the porous tissue paper and printing works. The film should not curl due to the lamination condition or change of temperature and humidity during storage. When it curls to a large extent, the handing property and transportability of the original sheet in a stencil printing machine are deteriorated, so that troubles such as clogging of the original sheet will occur.

(3) The film should have good thermal perforation sensitivity. That is, the film is molten with a small amount of heat, and has a shrinking property sufficient for forming suitable size holes to provide a clearly printed image.

(4) In the multiple engravings, the thermal perforation sensitivity is not decreased. That is, a surfactant and a silicone oil in a releasing layer, or molten mass of the film do not adhere to and contaminate a thermal head.

(5) Gradation of the thermal perforation is good. When the original sheet is used, if a part surrounding a specific part to be perforated is molten by the influence of perforation of the specific part, the degradation of the printed image is deteriorated unpreferably. Accordingly, the film should have a thermal perforating property that the part to be perforated and the part to be not perforated are clearly distinguished.

As the films used as a layer of the original sheet for stencil printing, there are known biaxially oriented thermoplastic resin films, thermal properties of which are specified to improve printing characteristics (Japanese Patent KOKAI Publication No. 149496/1987), a surface roughness and the number of protrusions of which are specified (Japanese Patent KOKAI Publication No. 227634/1988) and thermal shrinking properties of which are specified (Japanese Patent KOKAI Publication Nos. 282983/1987, 160895/1988, 312192/1988 and 30996/1991).

However, these films do not necessarily satisfy all the above required properties.

SUMMARY OF THE INVENTION

An object of the present invention is to provide a polyester film which is suitable for an original sheet for stencil printing.

According to the present invention, there is provided a film for a highly sensitive original sheet for stencil printing comprising a biaxially oriented polyester film having a melting point of 150° to 240° and a thickness of 0.2 to 3 µm, which satisfies all the following properties (1) to (5):

(1) $1.570 \leq n_{ave} \leq 1.578$,
(2) $100 \leq F \leq 800$
(3) $5 \leq S \leq 50$,
(4) $St \leq 15$, and
(5) $0.02 \leq Ra \leq 0.3$ wherein $n_{ave}$ is an average refractive index, F is a thermal shrinkage stress (g/mm$^2$) after being treated at 80° C. for 10 seconds, S is a thermal shrinkage factor (%) after being treated at 80° C. for 10 minutes, St is a shrinkage factor (%) after being treated in toluene at 25° C. for 10 minutes, and Ra is a center line average surface roughness (µm).

DETAILED DESCRIPTION OF THE INVENTION

The polyester to be used in the present invention comprises an aromatic dicarboxylic acid or its ester as a bifunctional acid component, and a glycol component.

Examples of the aromatic dicarboxylic acid or its ester are terephthalic acid, 2,6-naphthalenedicarboxylic acid, dimethyl terephthalate, dimethyl 2,6-naphthalenedicarboxylate, and the like. Among them, terephthalic acid and dimethyl terephthalate are preferred.

Examples of the glycol component are ethylene glycol, butylene glycol, propylene glycol, polyethylene glycol, 1,4-cyclo-hexanedimethanol, and the like. Among them, ethylene glycol and butylene glycol are preferred.

While the polyester usually comprises one aromatic carboxylic acid or its ester and one alkylene glycol, it is preferably a copolymer comprising at least two acid components and/or at least two glycol component.

In addition to the above exemplified components, the polyester may comprise other copolymerizable monomer such as a diol (e.g. diethylene glycol, neopentyl glycol, polyalkylene glycol, etc.), a dicarboxylic acid (e.g. adipic acid, sebacic acid, phthalic acid, isophthalic acid, etc.), trimellitic acid, pyromellitic acid, and the like.

Further, it is possible to use a blend of homopolymers each comprising a single kind of repeating unit, a blend of a homopolymer and a copolymer comprising at least two kinds of repeating units, or a blend of copolymers. Among them, a polyester blend of polybutylene terephthalate with polyethylene terephthalate or a polyethylene terephthalate copolymer which comprises isophthalic acid as a copolymerizable component is preferred.

The average refractive index $n_{ave}$ of the polyester film is from 1.570 to 1.578. When the average refractive index is less than 1.570, irregularity of perforation appears, while when it exceeds 1.578, the film has insufficient perforation sensitivity so that the image density of the printed image decreases.

The average refractive index is defined by the formula:

$$n_{ave}=(n_\alpha+n_\beta+n_\gamma)/3$$

wherein $n_\alpha$ is a refractive index in a direction of a film thickness, $n_\gamma$ is the maximum refractive index in a film plane, and $n_\beta$ is a refractive index in a direction perpendicular to the direction of the maximum refractive index in the film plane, which are measured at 23° C. using the sodium D line.

A degree of planar orientation ($\Delta P=(n_\gamma-n_\beta)/2-n_\alpha$) of the polyester film is usually from 0.100 to 0.150, preferably from 0.110 to 0.135. When $\Delta P$ is less than 0.100, thickness irregularity, density irregularity or size change may occur during the perforation. When $\Delta P$ exceeds 0.150, the resolution or quality of printing in the printing step may decrease.

A terminal carboxyl value of the polyester film of the present invention is less than 50 equivalents/$10^6$ g, preferably 40 equivalents/$10^6$ g. The original carboxyl value of each of the polyester resins before blending is increased by heat history and the like when two or more polyester resins are blended by a conventional melt extruder. Therefore, the original carboxyl value of the polyester resin is preferably less than 30 equivalents/$10^6$ g.

When the terminal carboxyl value of the polyester film is 50 equivalents/$10^6$ g or larger, randomization in the blending step of the two or more polyester resins using the conventional melt extruder for the production of the film is insufficient, so that the film is not uniformly perforated in a short period of time, and the gradation of the printed image tends to be deteriorated.

The melting point of the polyester film of the present invention is from 150° to 240° C., preferably from 160° to 230° C. When the melting point is higher than 240° C., the high perforation sensitivity, which is one of the properties to be achieved by the present invention, is not obtained. When the melting point is lower than 150° C., the heat resistant dimensional stability of the film is deteriorated, so that the film curls in the production step of the original sheet or during the storage of the original sheet, or the gradation of the printed image is insufficient. In the present invention, a difference between the highest melting point ($Tm_2$) and the lowest melting point ($Tm_1$) of the polyester film which are measured by a differential scanning calorimeter is less than 50° C., preferably less than 30° C. $Tm_2$ and $Tm_1$ may be the same. When this difference is 50° C. or larger, the original sheet may not be uniformly perforated in a short period of time, and the gradation of the printed image may be insufficient.

In the polyester film of the present invention, a ratio of moles of phosphorus atoms in the film to moles of magnesium and titanium atoms in the film (P/Me) is preferably from 0.3 to 1.0, more preferably from 0.4 to 0.8. When the P/Me ratio is less than 0.3, thermal stability of the polyester may be low, so that the heat resistant dimensional stability of the polyester may be deteriorated and, in turn, the film curls in the production step of the original sheet or during the storage of the original sheet, or the gradation of the printed image may be insufficient. When the P/Me ratio exceeds 1.0, randomization in the blending step of the two or more polyester resins using the conventional melt extruder for the production of the film is insufficient, so that the film may not be uniformly perforated in a short period of time, and the gradation of the printed image tends to be deteriorated.

The polyester film of the present invention has a thermal shrinkage stress F of 100 to 800 g/mm$^2$, preferably 150 to 500 g/mm$^2$ more preferably 280 to 400 g/mm$^2$ after being treated at 80° C. for 10 seconds. When the thermal shrinkage stress F is less than 100 g/mm$^2$, a force for expanding a pore is insufficient when the film is perforated so that a clear image is not printed, while when it exceeds 800 g/mm$^2$, thickness irregularity, image density irregularity or dimensional change occur.

The polyester film of the present invention has a thermal shrinkage stress F' of 80 to 270 g/mm$^2$, preferably 100 to 250 g/mm$^2$, after being treated at 100° C. for 10 seconds. When the thermal shrinkage stress F' is less than 80 g/mm$^2$, a force for expanding pores is insufficient when the film is perforated so that the pores may not have sufficient areas for providing a clear image, while when it exceeds 270 g/mm$^2$, thickness irregularity, image density irregularity or dimensional change may occur.

The polyester film of the present invention has a thermal shrinkage factor S (%) of 5 to 50%, preferably 10 to 40%, after being treated at 80° C. for 10 minutes. When the thermal shrinkage factor S is less than 5%, the perforation sensitivity is insufficient so that the image density is decreased, while when it exceeds 50%, the perforation irregularity tends to occur.

The a shrinkage factor St of the polyester film of the present invention after being treated in toluene at 25° C. for 10 minutes is not larger than 15%, preferably not larger than 10% When the shrinkage factor St exceeds 15%, the original sheet curls depending on the lamination conditions when the polyester film and the paper sheet are laminated, or the change of temperature and/or humidity during storage. When the original sheet curls, a handling property and the transportability of the original sheet in the stencil printing machine are deteriorated to cause some troubles such as clogging of the original sheet.

To obtain a film for highly heat sensitive original sheet for stencil printing having good resistance to curling, a balance between the above film properties and the shrinking properties, namely a heat shrinkage factor and the heat shrinkage stress is important. A product of the heat shrinkage factor S (%) and the heat shrinkage stress F' (g/mm$^2$) (S×F'), which is a measure of the balance of the shrinking properties, is preferably from 3000 to 7500. When the product S×F' is less than 3000, a force for expanding pores may be insufficient when the film is perforated so that the pores may not have sufficient areas for providing a clear image. When the product S×F' exceed 7500, the original sheet may curl depending on the lamination conditions when the polyester film and the paper sheet are laminated, or the change of temperature and/or humidity during storage. When the original sheet curls, the handling property and the transportability of the original sheet in the stencil printing machine are deteriorated to cause some troubles such as clogging of the original sheet. In addition, thickness irregularity, image density irregularity or dimensional change may occur.

A curl radius at room temperature and a curl radius at 50° C. are usually at least 18 mm, preferably at least 20 mm. When the curl radii at room temperature and 50° C. are less than 18 mm, the original sheet cannot be smoothly transported in the stencil printing machine to cause troubles such as clogging of the original sheet. A ratio of the curl radius at room temperature to the curl radius at 50° C. is usually from 1.0 to 2.0, preferably from 1.0 to 1.7. When this ratio exceeds 2.0, the original sheet easily curls under the lamination conditions or the change of temperature and/or humidity during storage.

The surface of the polyester film of the present invention may be roughened to impart a suitable slip property so as to improve the handling property of the polyester film of the present invention in a winding up step in the film production process, coating and laminating steps in the original sheet production process, and the printing process. To this end, inactive fine particles can be added to the polyester film.

The inactive fine particles to be used for the above purpose preferably has an average particle size D of 0.05 to 3.0 μm, a particle size distribution value r of 1.5 or less, more preferably an average particle size D of 0.1 to 2.0 μm and a particle size distribution value r of 1.4 or less. When the average particle size is less than 0.05 μm, the film may have a deteriorated winding property. When the average particle size exceeds 3.0 μm or the particle size distribution value r exceeds 1.5, the surface flatness of the film is deteriorated, so that heat conductance becomes irregular and the perforation becomes nonuniform, so that the resolution or the printing quality tend to be deteriorated.

An amount of the fine particles to be added is preferably from 0.05 to 3% by weight, more preferably from 0.1 to 2% by weight based on the weight of the polyester. When the amount of the fine particle is less than 0.05% by weight, the winding property may be deteriorated. When it exceeds 3% by weight, a degree of surface roughness of the film becomes too large, so that heat conductance becomes irregular and the perforation becomes nonuniform, whereby the resolution or the printing quality tend to be deteriorated.

Examples of the inactive particles to be used in the present invention are silicon oxide, titanium oxide, zeolite, silicon nitride, boron nitride, sellaite, alumina, calcium carbonate, magnesium carbonate, barium carbonate, calcium sulfate, barium sulfate, calcium phosphate, lithium phosphate, magnesium phosphate, lithium fluoride, kaolin, talc, carbon black, and crosslinked polymer fine particles disclosed in Japanese Patent Publication No. 5216/1984. These kinds of particles may be used independently or in combination of two or more kinds of particles at the same time.

Among the inactive particles, composite crosslinked polymer particles surfaces of which are treated with fine particles having Mohs' hardness of at least 7, and inactive particles having Mohs' hardness of at least 8.5 such as silicon carbide, boron nitride, titanium carbide and aluminum oxide are preferred. In particular, the above composite crosslinked polymer particles and the α-aluminum oxide particles are preferred.

An example of the above crosslinked polymer particles is a crosslinked polymer particle which is prepared by emulsion copolymerizing at least one monovinyl compound (A) having only one aliphatic unsaturated bond in a molecule and at least one compound (B) which has at least two aliphatic unsaturated bonds in a molecule and provides a crosslinkable site to the polymer. The emulsion polymerization means any of conventional emulsion polymerization processes including soap-free emulsion polymerization, seed emulsion polymerization, and the like.

Examples of the compound (A) are acrylic and methacrylic acids and their alkyl or glycidyl esters, maleic anhydride and its alkyl derivative, vinyl glycidyl ether, vinyl acetate, styrene, alkyl-substituted styrene, and the like.

Examples of the compound (B) are divinylbenzene, divinylsufone, ethylene glycol dimethacrylate, 1,4-butanediol diacrylate, and the like.

In addition to the compounds (A) and (B), a compound having a nitrogen atom or ethylene may be copolymerized.

As a polymerization initiator in the above emulsion polymerization, any of conventional initiators such as hydrogen peroxide, potassium persulfate, potassium persulfate-sodium thiosulfate and the like can be used.

As a dispersing aid for polymer particles in the polymerization system, there are used anionic surfactants (e.g. aliphatic acid salts, alkyl sulfate ester salts, alkylbenzenesulfonate salts, alkyl sulfosuccinate salts, alkyl naphthalenesulfonate salts, alkyl diphenyl ether disulfonate salts, alkyl phosphate salts, polyoxyethylene alkyl or alkylarylsulfate ester salts, etc.), nonionic surfactants (e.g. polyoxyethylene alkyl ether, polyoxyethylene alkylaryl ether, polyoxyethylene derivatives, polyoxyethylene-oxypropylene block copolymer, sorbitane aliphatic acid ester, polyoxyethylene sorbitane aliphatic acid ester, polyoxyethylene sorbitol aliphatic acid ester, glycerol aliphatic acid ester, etc), cationic surfactants (e.g. alkylamine salts, quaternary ammonium salts, etc.), and amphoteric surfactants (e.g. alkylbetaine, amine oxide, etc.). Among them, the cationic surfactants, in particular, alkyldiphenyl ether disulfonic acid salts are preferably used.

Preferably, the above copolymer has a crosslinked structure, and is heat resistant and substantially insoluble or unmeltable at high temperatures in the polyester production process or molding process. Preferably, the crosslinked polymer particles have a weight loss of not larger than 30% by weight, in particular not larger than 20% by weight after being treated at 300° C. for 30 minutes in a nitrogen gas stream.

The crosslinked polymer particles may be porous or nonporous. The porous crosslinked polymer particles are preferred since they have good affinity to the polyester.

The crosslinked polymer particles often aggregate, in particular when they have a small functionality density or the amount of the particle in relation to the polyester is large. This is remarkable, when an agitation power is weak in the polymerization process of the polyester.

When the composite crosslinked polymer particles surfaces of which are treated with the specific fine particles are used, the dispersibility of the particles in the polyester is improved and further, the original sheet comprising the polyester film containing such particles has a cleaning function to remove a surfactant and a silicone oil of the releasing layer and molten mass of the film which adhere to the thermal head, in the multiple engraving step. As the result, unexpectedly, the thermal perforation sensitivity does not decrease.

Examples of the inactive particles having the Mohs' hardness of at least 7 are silicon nitride, boron nitride, sellaite, zirconia, aluminum oxide, and the like. Among them, the aluminum oxide particles are preferred. The aluminum oxide particles can be produced by any of conventional methods such as a thermal decomposition method, namely a method for flame hydrolyzing anhydrous aluminum chloride, or a method for thermally decomposing ammonium alum, namely a method comprising reacting aluminum hydroxide as a raw material with sulfuric acid to form aluminum sulfate, reacting aluminum sulfate with ammonium sulfate to obtain ammonium alum and sintering ammonium alum.

Preferably, a crystal structure of aluminum oxide which is produced by one of the above methods is γ-type, θ-type or δ-type. In particular, δ-type aluminum oxide is preferred.

The inactive particles having the Mohs' hardness of at least 7 has an average primary particle size of 5 to 100 nm, preferably 10 to 50 nm. Since the particles often form aggregates having a particle size of 0.5 μm or larger, they are preferably comminuted and then used. When the average primary particle size is less than 5 nm, the particles form hard aggregates unpreferably. When the average primary particle size exceeds 100 nm, the particle-dispersion promoting effect in the polyester is insufficient.

An average secondary particle size of the aggregates of the fine particles having the Mohs' hardness of at least 7 which coat the surfaces of the crosslinked polymer particles is preferably 0.2 μm or less and smaller than the average particle size of the crosslinked polymer particles to be coated, for example a half or less, preferably one fifth or less, more preferably one tenth or less of the average particle size of the crosslinked polymer particles to be coated. More preferably, this average secondary particle size is from 0.03 to 0.1 μm. When the above secondary particle size exceeds 0.2 μm, the particle-dispersion promoting effect in the polyester is insufficient.

An amount of the inactive particles having the Mohs' hardness of at least 7 is 0.1 to 2 parts by weight, preferably 0.3 to 1 part by weight per one part by weight of the crosslinked polymer particles to be coated. When this amount is less than 0.1 part by weight, the dispersibility may not be improved, while when it exceeds 2 parts by weight, the dispersibility may not be improved further, but a slitting blade is significantly abraded by the particles having the Mohs' hardness of at least 7 when the film is slit.

The inactive fine particles having the Mohs' hardness of at least 7 can be coated on the surfaces of the crosslinked polymer particles by, for example, adding an aqueous dispersion of the fine particles having a positive ζ-potential therein to an aqueous dispersion of the crosslinked polymer particles when the crosslinked polymer particles dispersed in water have a negative ζ-potential, and agitating the mixture for 3 to 5 hours, whereby the crosslinked polymer particles are coated with the inactive fine particles having the Mohs' hardness of at least 7. The coating method is not limited to this method.

The original sheet for the stencil printing comprising the polyester film containing the highly hard particles has a cleaning function to remove a surfactant and a silicone oil of the releasing layer and molten mass of the film which adhere to the thermal head, in the multiple engraving step. As the result, unexpectedly, the thermal perforation sensitivity does not decrease.

A thickness T of the polyester film of the present invention is from 0.2 to 3 μm, preferably from 0.2 to 2.0 μm, more preferably from 0.2 to 1.5 μm. As the film thickness decreases, a heat conducting distance decreases and then an amount of heat necessary for perforating the film deceases, whereby the perforation property of the original sheet is improved and then the resolution and image quality are improved. But, when the film thickness is less than 0.2 μm, the image becomes unclear and density irregularity appears. In addition, the printing durability is remarkably decreased. When the film thickness exceeds 3 μm, the perforation property is deteriorated so that the irregularity appears during printing.

A ratio of the average particle size D of the inactive particles to be used according to the present invention to the film thickness T (D/T) is usually from 0.2 to 0.45, preferably from 0.3 to 0.45. When this ratio D/T exceeds 0.45, the flatness of the film surface is deteriorated and then the heat is not uniformly conducted, so that the perforated pores are not uniform, whereby the resolution and the printing quality may be deteriorated. When this ratio is less than 0.2, the winding property may be deteriorated so that the handling properties in the film production process and the original sheet production process tend to decrease.

The inactive particles can be compounded in the polyester by any of conventional methods. For example, the inactive particles are added in the polymerization step of the polyester or compound in the polyester by melt kneading before the polyester is formed in the film.

In the present invention, the film is suitably roughened by the above method.

According to the present invention, the polyester film has a center line average surface roughness Ra of 0.02 to 0.3 μm, preferably 0.05 to 0.2 μm to achieve the good handling property, the high resolution and printing quality of the image at higher levels. When the surface roughness Ra is outside the above range, the running property of the film is deteriorated so that the handling property of the film and the resolution and printing quality of the image are worsened.

Since the polyester film of the present invention is very thin, its handling property and the printing durability are improved, when the tensile moduli both in the machine and transverse directions of the film are in general at least 300 kg/mm$^2$, preferably at least 350 kg/mm$^2$.

Now, a production method of the polyester film of the present invention will be explained.

A polyester raw material is dried by a conventional method and supplied in an extruder. Then, the polyester is molten at a temperature higher than its melting point and extruded through a slit die in the form of a molten sheet.

The extruded molten sheet from the die is quickly cooled to a temperature lower than the glass transition temperature of the polyester on a rotating cooling drum to obtain an unoriented sheet which is substantially amorphous. To improve the flatness of the film, it is preferred to increase the adhesion between the sheet and the rotating cooling drum. To this end, the present invention preferably uses electrostatic pinning or liquid coating adhesion. In the electrostatic pinning, a linear electrode is stretched over the sheet in a direction perpendicular to a flow direction of the sheet, and a direct current of about 5 to 10 kV is applied to the electrode to charge static electricity on the sheet, whereby the adhesion of the sheet to the drum is increased. In the liquid coating adhesion, the whole or a part (e.g. parts contacting to the both edges of sheet) of the peripheral surface of rotating cooling drum is coated with a liquid uniformly, whereby the adhesion of the drum to the sheet is increased. These two methods may be used in combination in the present invention, if desired.

In the present invention, the obtained sheet is biaxially drawn to produce a film. Concretely, the unoriented sheet is drawn in one direction with a roll or a tenter at a temperature of preferably 20° to 100° C., more preferably 25° to 80° C. at a draw ratio of 2.5 to 7, preferably 3.0 to 5 in a single step or multi steps. In the next step, the uniaxially oriented film is drawn in a direction perpendicular to the direction of the first orientation at a temperature of preferably 20° to 100° C., more preferably 25° to 90° C. at a draw ratio of 2.5 to 7, preferably 3.0 to 5 to obtain a biaxially oriented film.

The drawing in each step can be carried out by multiple drawing steps. In such case, the total draw ratio is preferably in the above range.

It is possible to biaxially orient the sheet at the same time at an area draw ratio of 6 to 40.

If necessary, the biaxially oriented film may be again drawn in the machine and/or transverse directions before or after the heat treatment.

To obtain the polyester film having the above described thermal shrinking properties, preferably the polyester sheet is drawn at an area draw ratio of at least 6, and the biaxially oriented film is not subjected to the heat treatment or is heat treated at a temperature not higher than 110° C., preferably not higher than 90° C. for 1 second to 5 minutes at the constant length or with stretching the film by 30% or less.

When the polyester film is dried at a temperature of 40° to 50° C. in the production process of the original sheet or the original sheet is stored though a summer season, the original sheet may curl due to the shrinkage of the film. To prevent the curling, the polyester film is preferably aged at a temperature of 40° to 70° C. for 5 hours to 5 days, preferably at a temperature of 45° to 60° C. for 12 hours to 3 days, whereby the resistance to curling of the original sheet under the above conditions is much increased.

The polyester film of the present invention may contain 10% by weight or less of other polymer based on the weight of the polyester. Examples of the other polymer are polyethylene, polystyrene, polycarbonate, polysulfone, polyphenylenesulfide, polyamide, polyimide, and the like.

If necessary, the polyester film of the present invention may contain a suitable additive such as an antioxidant, a heat stabilizer, a lubricant, an antistatic agent, a dye, a pigment, and the like.

PREFERRED EMBODIMENTS OF THE INVENTION

The present invention will be illustrated by following Examples, which do not limit the scope of the present invention in any way. In Examples, "parts" are by weight unless otherwise indicated.

In Examples, the properties and characteristics are measured or evaluated as follows:

(1) Terminal carboxyl value

A terminal carboxyl value of the polyester is measured by the method of A. Conix described in Makromol. Chem., 26, 226 (1958), the disclosure of which is hereby incorporated by reference.

(2) Analyses of metals in the film

A quantitative analysis of Mg elements in the film is effected by an atomic absorption spectroscopy, while quantitative analyses of Ti and P elements are effected by an X-ray fluoroscopy.

(3) Melting point

A melting point of a polyester is measured using a differential scanning calorimeter (SSC580 DSC 20 type manufactured by Seiko Electronics Industries, Ltd.) by the following procedures:

A sample film of 10 mg is set in the DSC and heated at a rate of 10° C./min. and a melting endothermic curve in the temperature range between 0° C. and 300° C. is recorded. Melting points are read from the temperatures corresponding to the tops of the peaks in the melting endothermic curve. The lowest and highest melting points are designated as $Tm_1$ and $Tm_2$.

(4) Thermal shrinkage stresses (F and F')

A rectangular sample having a width of 10 mm is cut out from a film. One end of the sample is set to a chuck of a load detector and the other end to a fixed chuck. A distance between the chucks is 50 mm.

Without applying no initial load, the film sample is dipped in a water bath kept at 80° C., and a stress generated after 10 seconds from the start of dipping is measured. With five samples in each of the machine and transverse directions of the film, the stress is measured. Using a cross sectional area of the sample before dipping, a thermal shrinkage stress F (g/mm$^2$) is calculated, and those of five samples are averaged for each direction of the film.

By the same procedure except that the temperature of the water bath is changed to 100° C., a thermal shrinkage stress F' is calculated.

(5) Thermal shrinkage factor (S)

A sample of a film is kept in an oven at 80° C. without tension and heated for 10 minutes. The length of the sample before and after heat treatment is measured, and a thermal shrinkage factor S (%) is calculated according to the following equation:

S=[(sample length before heat treatment—sample length after heat treatment)×100]/(sample length before heat treatment)

With five samples in each of the machine and transverse directions of the film, the thermal shrinkage factors are measured and averaged.

(6) Thermal shrinkage factor in toluene (St)

A 10 cm square sample of a film is dipped in toluene at 25° C. for 10 minutes. The length of the sample before and after dipping in toluene is measured, and a thermal shrinkage factor St (%) is calculated according to the following equation:

St=[(sample length before dipping in toluene—sample length after dipping in toluene)×100]/(sample length before dipping in toluene)

With five samples in each of the machine and transverse directions of the film, the thermal shrinkage factors are measured and averaged.

(7) Refractive index of film

Using an Abbe refractometer (manufactured by Atago Optical Co., Ltd.), a refractive index $n_\alpha$ in the thickness direction of the film, a maximum refractive index $n_\gamma$ in the film plane, and a refractive index $n_\beta$ in the direction perpendicular to the main orientation direction in the film plane are measured using the sodium D line at 23° C., and an average refractive index $n_{ave}$, a birefringence $\Delta n$ and a degree of planar orientation $\Delta P$ are calculated according to the following equations:

$n_{ave}=(n_\alpha+n_\beta+n_\gamma)/3$, $\Delta n=n_\gamma-n_\beta$, $\Delta P=(n_\gamma-n_\beta)/2-n_\alpha$ (8) Dispersibility of particles in polyester A polyester film containing the particles is very thinly sliced at a thickness of about 800 Å using an ultrathin film-forming apparatus and the sliced sample is observed with a transmission electron microscope. The dispersibility of particles in the polyester is evaluated according to the following criteria:

O: Few aggregates of particles are observed.

X: Aggregates of particles are observed.

(9) Resistance to curling

Using a sheet of Japanese paper made of Manila hemp as a support of the polyester film having a thickness of 1.5 μm, and using a solution of a vinyl acetate-vinyl chloride copolymer in toluene (c=10 w/v %) as an adhesive, the polyester film is laminated on the support and dried in an air oven at 50° C. for 10 seconds to obtain an thermal sensitive original sheet for stencil printing. The obtained original sheet is kept in a thermo-hygrostat at a temperature of 50° C. and a humidity of 90% for one week. Then, the original sheet is subjected to a transportation test, and the transportation property is evaluated according to the following criteria:

O: The original sheet is slightly curled but transported in good condition.

X: The original sheet is curled to a large extent so that the troubles often happen during transportation.

(10) Average particle size of particles

Using a sedimentation type particle size distribution analyzer (SA-CP3 manufactured by Shimadzu Corporation), particle sizes are measured by the sedimentation method based on the Stokes' law of resistance, and a particle size corresponding to a volume percentage of 50% in terms of a diameter of an equivalent sphere is regarded as an average particle size.

A particle size distribution value r is calculated according to the following equation:

$$\text{Particle size distribution value} = d_{25}/d_{75}$$

wherein $d_{25}$ is a particle size of particle which is at the 25% volume based on the total volume of the particles and $d_{75}$ is a particle size of particle which is at the 75% volume based on the total volume of the particles, when an integrated volume of the particles is measured from the largest particles.

(11) Center line average surface roughness Ra

Using a surface roughness tester (SE-3F manufactured by Kosaka Kenkyusho, Ltd.), the center line average surface roughness Ra is measured according to JIS B-0601. The measuring conditions include the use of a probe having a tip radius of 2 μm, 30 mg of probe contact pressure, and 0.08 mm of cutoff.

(12) Practical properties of the heat sensitive original sheet for stencil printing An original sheet is prepared from a polyester film and a paper sheet and subjected to the following tests:

(a) Perforation sensitivity

The original sheet is subjected to the plate making using a thermal head to form a character image and a 16-step gradation image at an applied energy of 0.09 mJ or 0.12 mJ.

The image formed original sheet is observed with a microscope from the film side to evaluate conditions of perforation. The perforation state of the original sheet is evaluated according to the following criteria:

E (Excellent): The original sheet is perforated as designed, and sizes of holes are sufficient.

G (good): The original sheet is perforated as designed substantially, and sizes of holes are sufficient.

F (fair): In some parts, the original sheet is not perforated as designed or sizes of holes are insufficient.

B (bad): In many parts, the original sheet is not perforated as designed, and sizes of holes are insufficient. The original sheet cannot be used practically.

(b) Using the image formed original sheet, the image is printed on a paper sheet with Risograph AP 7200 printing machine (manufactured by Riso Kagaku Industries, Ltd.). With printed character and image, the image quality is evaluated according to the following criteria:

E (excellent): The image is clearly printed and has no density irregularity or blur.

G (good): The image is clearly printed and has little density irregularity or blur.

F (fair): The printed image has slight density irregularity and blur, and clearness of the image is slightly low.

B (bad): The printed image has apparent density irregularity, blur and thin spots.

EXAMPLE 1

Preparation of Polyester A

In a reactor, dimethyl terephthalate (100 parts) and ethylene glycol (60 parts) as raw materials, and magnesium acetate tetrahydrate (0.09 part) as a catalyst were charged and heated to 150° C. to start the reaction. Then the reaction temperature was gradually raised while removing methanol up to 230° C. over a period of 3 hours. After 4 hours, the transesterification was completed. To the reaction mixture, an ethylene glycol slurry (10 parts) containing 1.0 part of spherical silica particles having an average particle size of 0.70 μm and a particle size distribution value r of 1.2 was added.

To the mixture, ethyl acid phosphate (0.04 part) and antimony trioxide (0.04 part) were added to effect a polycondensation reaction for 4 hours, during which the temperature was gradually raised from 230° C. to 280° C., while the pressure was gradually decreased from atmospheric pressure to 0.3 mmHg. After 4 hours from the start of the polymerization, the reaction was terminated, and the resulting polymer was discharged by the pressure of nitrogen gas. The obtained polyester had an intrinsic viscosity of 0.75 (30° C. in phenol/tetrachloroethane (50/50 by volume)).

Preparation of Polyester B

In a reactor, dimethyl terephthalate (100 parts), 1,4-butanediol (56 parts) and tetrabutyl titanate (0.005 part) were charged and heated to 150° C. to start the reaction. The reaction temperature was gradually raised while removing methanol up to 210° C. over a period of 3 hours. After 4 hours, the transesterification was completed. To the reaction mixture, tetrabutyl titanate (0.005 part) was added to effect a polycondensation reaction for 4 hours, during which the temperature was gradually raised from 210° C. to 260° C., while the pressure was gradually decreased from atmospheric pressure to 0.3 mmHg. After 4 hours from the start of the polymerization, the reaction was terminated, and the resulting polymer was discharged by the pressure of nitrogen gas. The obtained polyester had an intrinsic viscosity of 0.90 (30° C. in phenol/tetrachloroethane (50/50 by volume)).

Preparation of Polyester C

In the same manner as that of the preparation of Polyester A except that a mixture of dimethyl terephthalate (80 parts) and dimethyl isophthalate (20 parts) was used in place of dimethyl terephthalate (100 parts), the reactions were effected to obtain Polyester C, which had an intrinsic viscosity of 0.76 (30° C. in phenol/tetrachloroethane (50/50 by volume)).

Production of a polyester film and a heat sensitive original sheet for stencil printing:

Polyester A (50 parts) and Polyester B (50 parts) were homogeneously blended and extruded from an extruder at 265° C. in a sheet form and quenched and solidified on a rotating cooling drum a surface temperature of which was maintained at 30° C., using the electrostatic pinning method to obtain a substantially amorphous polyester sheet having a thickness of 15 μm.

The obtained sheet was drawn in a machine direction at 65° C. at a draw ratio of 3.5 and in a transverse direction at 70° C. at a draw ratio of 3.7, followed by heat treating at 90° C. for 6 seconds, to obtain a biaxially oriented polyester film having a thickness of 1.5 μm.

The polyester film was adhered to the hemp-made porous thin paper sheet using the same adhesive as used in the resistance to curling test and aged at 50° C. for 24 hours to obtain a heat sensitive original sheet for stencil printing.

EXAMPLE 2

In the same manner as in Example 1 except that 50 parts of Polyester C in place of 50 parts of Polyester A, a heat sensitive original sheet for stencil printing was prepared.

EXAMPLE 3

In the same manner as in Example 1 except that a mixture of 30 parts of Polyester A, 30 parts of Polyester B and 40 parts of reclaimed polyester obtained from the trimmed edges and end parts of the polyester film produced in Example 1 was used, a heat resistant original sheet for stencil printing was prepared.

COMPARATIVE EXAMPLE 1

In the same manner as in Example 1 except that 100 parts of Polyester C was extruded at an extruder temperature of 280° C. and a produced sheet was drawn in a machine direction at 80° C. at a draw ratio of 3.5 and in a transverse direction at 90° C. at a draw ratio of 3.7, a heat sensitive original sheet for stencil printing was prepared.

COMPARATIVE EXAMPLE 2

In the same manner as in Example 1 except that a undrawn sheet having a thickness of 33 μm was produced and drawn in a machine direction at a draw ratio of 4.7 and in a transverse direction at a draw ratio of 4.7, a heat sensitive original sheet for stencil printing was prepared.

COMPARATIVE EXAMPLE 3

In the same manner as in Example 1 except that the biaxially oriented film was heat treated at 140° C. for 6 seconds, a heat sensitive original sheet for stencil printing was prepared.

The properties of the polyester films and the practical properties of the original sheets prepared in Examples 1–3 and Comparative Examples 1–3 are summarized in Tables 1 and 2, respectively.

TABLE 1

| Example No. | Melting point (°C.) $Tm_1$ | $Tm_2$ | Ra (μm) | $n_{ave}$ | F (g/mm$^2$) | S (%) | St (%) | Resistance to curling |
|---|---|---|---|---|---|---|---|---|
| 1 | 212 | 249 | 0.094 | 1.5745 | 380 | 18 | 8 | ○ |
| 2 | 216 | 222 | 0.102 | 1.5750 | 360 | 19 | 6 | ○ |
| 3 | 210 | 231 | 0.097 | 1.5735 | 370 | 23 | 9 | ○ |
| C.1 | 257 | — | 0.095 | 1.5872 | 400 | 35 | 7 | ○ |
| C.2 | 213 | 252 | 0.096 | 1.5745 | 650 | 33 | 17 | X |
| C.3 | 212 | 250 | 0.105 | 1.5790 | 380 | 2 | 2 | X |

TABLE 2

| Example No. | Practical properties of original sheet (0.09 mJ/0.12 mJ) | |
|---|---|---|
| | Perforation sensitivity | Image quality |
| 1 | G/E | E/E |
| 2 | E/E | E/E |
| 3 | E/E | E/E |
| C.1 | B/B | B/B |
| C.2 | G/G | F/G |
| C.3 | B/B | B/B |

EXAMPLE 4

Preparation of Polyester A'

In a reactor, dimethyl terephthalate (100 parts) and ethylene glycol (60 parts) as raw materials, and magnesium acetate tetrahydrate (0.09 part) as a catalyst were charged and heated to 150° C. to start the reaction. Then the reaction temperature was gradually raised while removing methanol up to 230° C. over a period of 3 hours. After 4 hours, the transesterification was completed. To the reaction mixture, 10 parts of an ethylene glycol slurry containing 0.5 part of crosslinked polymer particles having an average particle size of 0.7 μm and a particle size distribution value r of 1.25 and 0.08 part of spherical silica particles having an average particle size of 1.2 μm and a particle size distribution value r of 1.27 was added.

To the mixture, ethyl acid phosphate (0.04 part) and antimony trioxide (0.04 part) were added to effect a polycondensation reaction for 3.5 hours, during which the temperature was gradually raised from 230° C. to 280° C., while the pressure was gradually decreased from atmospheric pressure to 0.3 mmHg. After 3.5 hours from the start of the polymerization, the reaction was terminated, and the resulting polymer was discharged by the pressure of nitrogen gas. The obtained polyester had an intrinsic viscosity of 0.51 (30° C. in phenol/tetrachloroethane (50/50 by volume)).

Thereafter, the obtained polymer was polymerized in the solid state at 225° C. under 0.3 mmHg for 10 hours. The finally obtained polyester had an intrinsic viscosity of 0.71 (30° C. in phenol/tetrachloroethane (50/50 by volume)), the P/Me ratio of 0.69, and the terminal carboxyl value of 20 eq./$10^6$ g.

Preparation of Polyester B'

In a reactor, dimethyl terephthalate (100 parts), 1,4-butanediol (56 parts) and tetrabutyl titanate (0.004 part) were charged and heated to 150° C. to start the reaction. The reaction temperature was gradually raised while removing methanol up to 210° C. over a period of 3 hours. After 4 hours, the transesterification was completed. To the reaction mixture, tetrabutyl titanate (0.004 part) was added to effect a polycondensation reaction for 3 hours, during which the temperature was gradually raised from 210° C. to 260° C., while the pressure was gradually decreased from atmospheric pressure to 0.3 mmHg. After 3 hours from the start of the polymerization, the reaction was terminated, and the resulting polymer was discharged by the pressure of nitrogen gas. The obtained polyester had an intrinsic viscosity of 0.80 (30° C. phenol/tetrachloroethane (50/50 by volume)).

Thereafter, the obtained polymer was polymerized in the solid state at 200° C. under 0.3 mmHg for 10 hours. The finally obtained polyester had an intrinsic viscosity of 1.05 (30° C. in the same solvent as above), and the terminal carboxyl value of 19 eq./$10^6$ g.

Production of a polyester film and a heat sensitive original sheet for stencil printing:

Polyester A' (50 parts) and Polyester B' (50 parts) were homogeneously blended and extruded from an extruder at 265° C. in a sheet form and quenched and solidified on a rotating cooling drum a surface temperature of which was maintained at 30° C., using the electrostatic pinning method to obtain a substantially amorphous polyester sheet having a thickness of 15 μm.

The obtained sheet was drawn in a machine direction at 65° C. at a draw ratio of 3.5 and in a transverse direction at 70° C. at a draw ratio of 3.7, followed by heat treating at 90° C. for 6 seconds, to obtain a biaxially oriented polyester film having a thickness of 1.5 μm.

The polyester film was adhered to the hemp-made porous thin paper sheet using the same adhesive as used in the resistance to curling test and aged at 50° C. for 24 hours to obtain a heat sensitive original sheet for stencil printing.

EXAMPLE 5

In the same manner as in the preparation of Polyester A' in Example 4 except that the polycondensation time was changed to 4 hours, Polyester C' was prepared.

Polyester C' before the solid state polymerization had an intrinsic viscosity of 0.63 (30° C. in phenol/tetrachloroethane (50/50 by volume)), and after the solid state polymerization, it had an intrinsic viscosity of 0.75 (30° C. in the same solvent as above), the P/Mr ratio of 0.70, and the terminal carboxyl value of 33 eq./$10^6$ g.

In the same way as in Example 4 except that 50 parts of Polyester C' was used in place of 50 parts of Polyester A', a heat sensitive original sheet for stencil printing was prepared.

EXAMPLE 6

In the same manner as in the preparation of Polyester A' in Example 4 except that a mixture of 80 parts of dimethyl terephthalate and 20 parts of dimethyl isophthalate in place of 100 parts of dimethyl terephthalate, and the solid state polymerization was effected at 200° C. under 0.3 mmHg for 10 hours, Polyester D was prepared.

Polyester D before the solid state polymerization had an intrinsic viscosity of 0.53 (30° C. in phenol/tetrachloroethane (50/50 by volume)), and after the solid state polymerization, it had an intrinsic viscosity of 0.80 (30° C. in the same solvent as above), the P/Mr ratio of 0.70, and the terminal carboxyl value of 30 eq./$10^6$ g.

In the way as in Example 4 except that 50 parts of Polyester D was used in place of 50 parts of Polyester A', a heat sensitive original sheet for stencil printing was prepared.

COMPARATIVE EXAMPLE 4

In the same manner as in the preparation of Polyester A' in Example 4 except that the polyester was not subjected to the solid state polymerization, Polyester E was prepared.

Polyester E had an intrinsic viscosity of 0.66 (30° C. in phenol/tetrachloroethane (50/50 by volume)), the P/Mr ratio of 0.69, and the terminal carboxyl value of 45 eq./$10^6$ g.

In the same manner as in the preparation of Polyester A' in Example 4 except that the polycondensation time was changed to 3.5 hours and the polyester was not subjected to the solid state polymerization, Polyester F was prepared.

Polyester F had an intrinsic viscosity of 0.85 (30° C. in the same solvent as above), and the terminal carboxyl value of 60 eq./$10^6$ g.

In the same way as in Example 4 except that 50 parts of Polyester E was used in place of 50 parts of Polyester A' and 50 parts of Polyester F was used in place of 50 parts of Polyester B', a heat sensitive original sheet for stencil printing was prepared.

The properties of the polyester films and the practical properties of the original sheets prepared in Examples 4–6 and Comparative Example 4 are summarized in Tables 3 and 4, respectively.

TABLE 3

| Example No. | Terminal COOH value/ $10^6$ g | P/Me | Melting point (°C.) Tm$_1$ | Melting point (°C.) Tm$_2$ | Ra (μm) | F (g/mm$^2$) | S (%) | St (%) | n$_{ave}$ | Resistance to curling |
|---|---|---|---|---|---|---|---|---|---|---|
| 4 | 30 | 0.66 | 208 | 230 | 0.094 | 380 | 18 | 7 | 1.5750 | ○ |
| 5 | 35 | 0.66 | 209 | 235 | 0.102 | 360 | 19 | 6 | 1.5746 | ○ |
| 6 | 37 | 0.66 | 215 | 225 | 0.102 | 360 | 19 | 8 | 1.5740 | ○ |
| C.4 | 67 | 0.66 | 209 | 252 | 0.095 | 430 | 35 | 6 | 1.5865 | X |

TABLE 4

| Example No. | Practical properties of original sheet (0.09 mJ/0.12 mJ) | |
|---|---|---|
| | Perforation sensitivity | Image quality |
| 4 | G/E | E/E |
| 5 | G/E | G/E |
| 6 | E/E | E/E |
| C.4 | B/F | B/B |

EXAMPLE 7

Polyester A (50 parts) and Polyester B (50 parts) were homogeneously blended and extruded from an extruder at 265° C. in a sheet form and quenched and solidified on a rotating cooling drum a surface temperature of which was maintained at 30° C., using the electrostatic pinning method to obtain a substantially amorphous polyester sheet having a thickness of 13.5 μm.

The obtained sheet was drawn in a machine direction at 65° C. at a draw ratio of 2.5 and further at 75° C. at a draw ratio of 1.2, and in a transverse direction at 80° C. at a draw ratio of 3.0, followed by heat treating at 90° C. for 6 seconds, to obtain a biaxially oriented polyester film having a thickness of 1.5 μm.

The polyester film was adhered to the hemp-made porous thin paper sheet using the same adhesive as used in the resistance to curling test and aged at 50° C. for 24 hours to obtain a heat sensitive original sheet for stencil printing.

EXAMPLE 8

In the same manner as in Example 7 except that 50 parts of Polyester C was used in place of 50 parts of Polyester A, a heat sensitive original sheet for stencil printing was prepared.

EXAMPLE 9

In the same manner as in Example 7 except that the draw ratio in the transverse direction was changed to 3.3, a heat sensitive original sheet for stencil printing was prepared.

EXAMPLE 10

In the same manner as in Example 7 except that a mixture of 30 parts of Polyester A, 30 parts of Polyester B and 40 parts of reclaimed polyester obtained from the trimmed edges and end parts of the polyester film produced in Example 7 was used in place of the mixture of 50 parts of Polyester A and 50 parts of Polyester B, a heat resistance original sheet for stencil printing was prepared.

COMPARATIVE EXAMPLE 5

In the same manner as in Example 7 except that Polyester C (100 parts) was extruded at an extruder temperature of 280° C. and a produced sheet was drawn in a machine direction at 80° C. at a draw ratio of 3.0 and in a transverse direction at 90° C. at a draw ratio of 3.0, a heat sensitive original sheet for stencil printing was prepared.

COMPARATIVE EXAMPLE 6

In the same manner as in Example 7 except that the biaxially oriented film was heat treated at 140° C. for 6 seconds, a heat sensitive original sheet for stencil printing was prepared.

The properties of the polyester films and the practical properties of the original sheets prepared in Examples 7–10 and Comparative Examples 5–6 are summarized in Tables 5 and 6, respectively.

TABLE 5

| Example No. | Melting point (°C.) $Tm_1$ | $Tm_2$ | ΔP | Ra (μm) | S (%) | F' (g/ mm²) | S × F' | $n_{ave}$ | St (%) | Curl radius at room temp. (mm) | Curl radius at 50° C. (mm) | Ratio of curl radius Room temp./50° C. |
|---|---|---|---|---|---|---|---|---|---|---|---|---|
| 7 | 212 | 249 | 0.122 | 0.094 | 20 | 250 | 5000 | 1.5742 | 5 | 30 | 25 | 1.2 |
| 8 | 216 | 222 | 0.123 | 0.092 | 23 | 240 | 5520 | 1.5731 | 4 | 32 | 27 | 1.2 |
| 9 | 213 | 250 | 0.125 | 0.105 | 25 | 260 | 6500 | 1.5735 | 7 | 37 | 23 | 1.6 |
| 10 | 211 | 230 | 0.121 | 0.095 | 18 | 200 | 3600 | 1.5840 | 6 | 31 | 28 | 1.1 |
| C.5 | 257 | — | 0.127 | 0.094 | 35 | 400 | 14000 | 1.5752 | 17 | 51 | 23 | 2.2 |
| C.6 | 213 | 251 | 0.160 | 0.093 | 2 | 240 | 480 | 1.5830 | 2 | 30 | 17 | 1.8 |

TABLE 6

| Example No. | Practical properties of original sheet (0.09 mJ/0.12 mJ) | |
|---|---|---|
| | Perforation sensitivity | Image quality |
| 7 | G/E | E/E |
| 8 | E/E | E/E |
| 9 | E/E | E/E |
| 10 | E/E | E/E |
| C.5 | B/B | B/B |
| C.6 | B/B | B/B |

EXAMPLE 11

Preparation of crosslinked polymer particles

To desalted water (1500 parts), potassium persulfate (0.5 part) as a water-soluble polymerization initiator and sodium laurylsulfate (Emal O (trade name) manufactured by Kao Corp.) (0.025 part) as a dispersion stabilizer were added and dissolved homogeneously. To the solution, a mixture of ethylene glycol dimethacrylate (60 parts), methyl methacrylate (20 parts) and divinylbenzene (20 parts) was added and polymerized at 70° C. for 24 hours in a nitrogen atmosphere while stirring. The polymer obtained at a reaction ratio of 98% had an average particle size of 1.2 μm and a particle size distribution value r of 1.23. A weight loss was 5.2%. The obtained polymer had a ζ-potential of −20 mV when pH was 6.0. The obtained polymer particles were observed using an electron microscope to find that they were substantially spherical.

To desalted water (500 parts), δ-alumina particles having a primary particle size of 18 nm (50 parts)was added and dispersed in a homomixer. Then, to the dispersion, ethyl acid phosphate (0.5 part) was added to adjust pH to 5.0, and the dispersion was comminuted with a sand grinder and filtrated to obtain an aqueous slurry containing the alumina particles, which had an average secondary particle size of 0.04 μm and a ζ-potential of +30 mV.

Then, the above aqueous slurry of the crosslinked polymer particles (1600 parts) and the aqueous slurry of the δ-alumina particles (550 parts) were mixed and stirred for 4 hours to coat the crosslinked polymer particles with the δ-alumina particles. To the aqueous slurry, ethylene glycol (1500 parts) was added, and water was evaporated off by heating under reduced pressure to form an ethylene glycol slurry. The particles in the slurry was observed using an electron microscope to find that substantially the whole surfaces of the crosslinked polymer particles were coated with the alumina particles.

Preparation of Polyester A"

In a reactor, dimethyl terephthalate (80 parts), dimethyl isophthalate (20 parts) and ethylene glycol (60 parts) as raw materials, and magnesium acetate tetrahydrate (0.09 part) as a catalyst were charged and heated to 150° C. to start the reaction. Then the reaction temperature was gradually raised while removing methanol up to 230° C. over a period of 3 hours. After 4 hours, the transesterification was completed. To the reaction mixture, an ethylene glycol slurry (22 parts) containing 1.0 part of the alumina-coated crosslinked polymer particles was added.

To the mixture, ethyl acid phosphate (0.04 part) and antimony trioxide (0.04 part) were added to effect a polycondensation reaction for 4 hours, during which the temperature was gradually raised from 230° C. to 280° C., while the pressure was gradually decreased from atmospheric pressure to 0.3 mmHg. After 4 hours from the start of the polymerization, the reaction was terminated, and the resulting polymer was discharged by the pressure of nitrogen gas. The obtained polyester had an intrinsic viscosity of 0.75 (30° C. in phenol/tetrachloroethane (50/50 by volume)).

The particles in the polymer were observed with a transmission electron microscope to find that the surfaces of the crosslinked polymer particles were coated with the δ-alumina particles, and the dispersibility of the particles was very good.

Production of a polyester film and a heat sensitive original sheet for stencil printing:

Polyester A" (50 parts) and Polyester B (50 parts) were homogeneously blended and extruded from an extruder at 265° C. in a sheet form and quenched and solidified on a rotating cooling drum a surface temperature of which was maintained at 30° C., using the electrostatic pinning method to obtain a substantially amorphous polyester sheet having a thickness of 15 μm.

The obtained sheet was drawing in a machine direction at 65° C. at a draw ratio of 3.5 and in a transverse direction at 70° C. at a draw ratio of 3.7, followed by heat treating at 90° C. for 6 seconds, to obtain a biaxially oriented polyester film having a thickness of 1.5 μm.

The produced polyester film had the melting points of 211° C. and 223° C.

The polyester film was adhered to the hemp-made porous thin paper sheet using the same adhesive as used in the resistance to curling test and aged at 50° C. for 24 hours to obtain a heat sensitive original sheet for stencil printing.

EXAMPLE 12

In the same manner as in Example 11 except that 30 parts of δ-alumina particles were used, a heat sensitive original sheet for stencil printing was prepared.

EXAMPLE 13

In the same manner as in Example 11 except that 50 parts of γ-alumina particles having an average primary particle size of 12 nm was used in place of the δ-alumina particles, a heat sensitive original sheet for stencil printing. An average secondary particle size of the γ-alumina particles was 0.07 nm.

EXAMPLE 14

In the same manner as in Example 11 except that 1.0 part of potassium persulfate was used as a water-soluble polymerization initiator and 0.051 part of sodium laurylsulfate (Emal O (trade name) manufactured by Kao Corp.) was used as a dispersion stabilizer, a heat sensitive original sheet for stencil printing was prepared.

The obtained crosslinked polymer particles had an average particle size of 0.8 μm and a particle size distribution value r of 1.20.

The properties of the polyester films and the practical properties of the original sheets prepared in Examples 11–14 are summarized in Tables 7 and 8, respectively.

TABLE 7

| Example No. | Ra (μm) | Dispersibility in polymer | F (g/mm²) | S (%) | $n_{avc}$ | St (%) |
|---|---|---|---|---|---|---|
| 11 | 0.090 | Good | 390 | 17 | 1.5747 | 7 |
| 12 | 0.102 | Good | 380 | 16 | 1.5750 | 7 |
| 13 | 0.097 | Good | 390 | 18 | 1.5739 | 6 |
| 14 | 0.070 | Good | 385 | 17 | 1.5745 | 9 |

TABLE 8

| Example No. | Practical properties of original sheet (0.09 mJ/0.12 mJ) | | |
|---|---|---|---|
| | Perforation sensitivity | Image quality | Printing durability |
| 11 | E/E | E/E | Good |
| 12 | E/E | E/E | Good |
| 13 | G/E | G/E | Good |
| 14 | E/E | G/E | Good |

EXAMPLE 15

Preparation of Polyester A'''

In a reactor, dimethyl terephthalate (80 parts), dimethyl isophthalate (20 parts) and ethylene glycol (60 parts) as raw materials, and magnesium acetate tetrahydrate (0.09 part) as a catalyst were charged and heated to 150° C. to start the reaction. Then the reaction temperature was gradually raised while removing methanol up to 230° C. over a period of 3 hours. After 4 hours, the transesterification was completed. To the reaction mixture, an ethylene glycol slurry (10 parts) containing 1.0 part of α-alumina particles having Mohs' hardness of 9 and an average particle size of 0.7 μm was added.

To the mixture, ethyl acid phosphate (0.04 part) and antimony trioxide (0.04 part) were added to effect a polycondensation reaction for 4 hours, during which the temperature was gradually raised from 230° C. to 280° C., while the pressure was gradually decreased from atmospheric pressure to 0.3 mmHg. After 4 hours from the start of the polymerization, the reaction was terminated, and the resulting polymer was discharged by the pressure of nitrogen gas. The obtained polyester had an intrinsic viscosity of 0.75 (30° C. in phenol/tetrachloroethane (50/50 by volume)).

Production of a polyester film and a heat sensitive original sheet for stencil printing:

Polyester A'''(50 parts) and Polyester B (50 parts) were homogeneously blended and extruded from an extruder at 265° C. in a sheet form and quenched and solidified on a rotating cooling drum a surface temperature of which was maintained at 30° C., using the electrostatic pinning method to obtain a substantially amorphous polyester sheet having a thickness of 15 μm.

The obtained sheet was drawing in a machine direction at 65° C. at a draw ratio of 3.5 and in a transverse direction at 70° C. at a draw ratio of 3.7, followed by heat treating at 90° C. for 6 seconds, to obtain a biaxially oriented polyester film having a thickness of 1.5 μm.

The produced polyester film had the melting points of 211° C. and 223° C.

The polyester film was adhered to the hemp-made porous thin paper sheet using the same adhesive as used in the resistance to curling and aged at 50° C. for 24 hours to obtain a heat sensitive original sheet for stencil printing.

EXAMPLE 16

In the same manner as in Example 15 except that 20 parts of an ethylene glycol slurry containing 2.0 parts of α-alumina particles having Mohs' hardness of 9 and an average particle size of 0.5 μm was used in the preparation of the Polyester A''', a heat sensitive original sheet for stencil printing was prepared.

EXAMPLE 17

In the same manner as in Example 15 except that 10 parts of an ethylene glycol slurry containing 1.0 parts of silicon carbide particles having Mohs' hardness of 9 and an average particle size of 0.7 μm was used in the preparation of the Polyester A''', a heat sensitive original sheet for stencil printing was prepared.

EXAMPLE 18

In the same manner as in Example 15 except that 20 parts of an ethylene glycol slurry containing 1.0 parts of α-alumina particles having Mohs' hardness of 9 and an average particle size of 0.5 82 m and 0.09 part of calcium carbonate particles having Mohs' hardness of 3.0 and an average particle size of 1.0 μm was used in the preparation of the Polyester A''', a heat sensitive original sheet for stencil printing was prepared.

COMPARATIVE EXAMPLE 7

In the same manner as in Example 15 except that 10 parts of an ethylene glycol slurry containing 1.0 parts of silica particles having Mohs' hardness of 5.5–6.6 and an average particle size of 0.7 μm was used in the preparation of the Polyester A''', a heat sensitive original sheet for stencil printing was prepared.

The properties of the polyester films and the practical properties of the original sheets prepared in Examples 15–18 and Comparative Example 7 are summarized in Tables 9 and 10, respectively.

TABLE 9

| Example No. | Ra (μm) | F (g/mm$^2$) | S (%) | $n_{ave}$ | St (%) |
|---|---|---|---|---|---|
| 15 | 0.090 | 350 | 17 | 1.5740 | 6 |
| 16 | 0.102 | 280 | 16 | 1.5750 | 5 |
| 17 | 0.097 | 340 | 18 | 1.5735 | 7 |
| 18 | 0.117 | 360 | 18 | 1.5847 | 8 |
| C.7 | 0.165 | 390 | 19 | 1.5744 | 9 |

TABLE 10

| | Practical properties of original sheet | | |
|---|---|---|---|
| | (0.09 mJ/0.12 mJ) | | |
| Example No. | Perforation sensitivity | Image quality | Printing durability |
| 15 | E/E | E/E | Good |
| 16 | E/E | E/E | Good |
| 17 | E/E | E/E | Good |
| 18 | E/E | E/E | Good |
| C.7 | G/G | G/G | No Good |

What is claimed is:

1. A film for a heat sensitive original sheet for stencil printing comprising a biaxially oriented polyester film comprising a blend of polybutylene terephthalate with polyethylene terephthalate or a blend of polybutylene terephthalate with a polyethylene terephthalate copolymer, the film having a melting point of 150° to 240° C. and a thickness of 0.2 to 3 μm, which satisfies all the following properties (1) to (5):

(1) $1{,}570 \leq n_{ave} \leq 1.578$,
   (2) $100 \leq F \leq 800$
   (3) $5 \leq S \leq 50$,
   (4) $St \leq 15$, and
   (5) $0.02 \leq Ra \leq 0.3$ wherein $n_{ave}$ is an average refractive index, F is a thermal shrinkage stress (g/mm$^2$) after being treated at 80° C. for 10 seconds, S is thermal shrinkage factor (%) after being treated at 80° C. for 10 minutes, St is a thermal shrinkage factor (%) after being treated in toluene at 25° C. for 10 minutes, and Ra is a center line average surface roughness (μm)

and wherein the film has a thermal shrinkage stress F' of 80 to 270 g/mm2 after being treated at 100° C. for ten seconds.

2. The film for a heat sensitive original sheet for stencil printing according to claim 1, which contains inactive particles.

3. The film for a heat sensitive original sheet for stencil printing according to claim 2, wherein said inactive particles have an average particle size of 0.05 to 3 μm.

4. The film for a heat sensitive original sheet for stencil printing according to claim 2, wherein the amount of said inactive particles is from 0.05 to 3% by weight based on the weight of the polyesters.

5. The film for a heat sensitive original sheet for stencil printing according to claim 2, wherein said inactive particles have Mohs' hardness of at least 8.5.

6. The film for a heat sensitive original sheet for stencil printing according to claim 1, wherein the polyester film comprises a blend of (i) polybutylene terephthalate with (ii) polyethylene terephthalate.

7. The film for a heat sensitive original sheet for stencil printing according to claim 1, wherein the polyester film comprises a blend of (i) polybutylene terephthalate with (ii) a polyethylene terephthalate copolymer.

8. The film for a heat sensitive original sheet for stencil printing according to claim 7, wherein the polyethylene terephthalate copolymer comprises isophthalic acid or an ester thereof as a copolymerizable component.

9. The film for a heat sensitive original sheet for stencil printing according to claim 1, wherein the film has a degree of planar orientation of from 0.100 to 0.150.

10. The film for a heat sensitive original sheet for stencil printing according to claim 1, wherein the terminal carboxyl value of the polyester film is less than 50 equivalents/10$^6$ grams.

11. The film for a heat sensitive original sheet for stencil printing according to claim 1, wherein the difference in melting point between the polyester of the highest melting point and the polyester of the lowest melting point is less than 50° C.

12. The film for a heat sensitive original sheet for stencil printing according to claim 1, wherein the ratio of moles of phosphorus atoms in the film to moles of magnesium and titanium atoms in the film is from 0.3 to 1.0.

13. The film for a heat sensitive original sheet for stencil printing according to claim 1, wherein the product of the heat shrinkage factor S (%) and the heat shrinkage stress F' of the film after being treated at 100° C. for ten seconds, is from 3,000 to 7,500.

14. The film for a heat sensitive original sheet for stencil printing according to claim 1, wherein the film has a curl radius at 50° C. of at least 18 mm.

15. The film for a heat sensitive original sheet for stencil printing according to claim 2, wherein the particles have a particle size distribution value r greater than 1.5.

16. The film for a heat sensitive original sheet for stencil printing according to claim 2, wherein the particles comprise inorganic particles selected from the group consisting of silicon oxide, titanium oxide, zeolite, silicon nitride, boron nitride, sellaite, alumina, calcium carbonate, magnesium carbonate, barium carbonate, calcium sulfate, barium sulfate, calcium phosphate, lithium phosphate, magnesium phosphate, lithium fluoride, kaolin, talc, carbon black, silicon carbide, and titanium carbide.

17. The film for a heat sensitive original sheet for stencil printing according to claim 2, wherein the particles comprise crosslinked polymeric particles.

18. The film for a heat sensitive original sheet for stencil printing according to claim 17, wherein the organic particles are prepared by emulsion polymerization of at least one monovinyl compound having only one aliphatic unsaturated bond and at least one compound which has at least two aliphatic unsaturated bonds and provides a crosslinkable site.

19. The film for a heat sensitive original sheet for stencil printing according to claim 2, wherein the ratio of the average particle size of the inactive particles to the film thickness is from 0.2 to 0.45.

* * * * *